(12) United States Patent
Fogwill et al.

(10) Patent No.: US 12,474,307 B2
(45) Date of Patent: Nov. 18, 2025

(54) SOLVENT DELIVERY WITH A REDUCED VOLUME SINGLE STROKE PUMPING ARRANGEMENT PROVIDING CONTINUOUS SOLVENT FLOW

(71) Applicant: Waters Technologies Corporation, Milford, MA (US)

(72) Inventors: Michael O. Fogwill, Uxbridge, MA (US); Sylvain G. Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 697 days.

(21) Appl. No.: 17/708,665

(22) Filed: Mar. 30, 2022

(65) Prior Publication Data

US 2022/0317098 A1  Oct. 6, 2022

Related U.S. Application Data

(60) Provisional application No. 63/168,612, filed on Mar. 31, 2021.

(51) Int. Cl.
*G01N 30/32* (2006.01)
(52) U.S. Cl.
CPC ....... *G01N 30/32* (2013.01); *G01N 2030/326* (2013.01)
(58) Field of Classification Search
CPC .............. F04B 13/02; F04B 2201/0209; F04B 2205/09; F04B 23/02; F04B 23/06;
(Continued)

(56) References Cited

U.S. PATENT DOCUMENTS

| 4,311,586 A | 1/1982 | Baldwin et al. |
| 4,990,250 A | 2/1991 | Hellinger |

(Continued)

FOREIGN PATENT DOCUMENTS

| EP | 2703809 A2 | 3/2014 |
| GB | 1450400 A | 9/1976 |

OTHER PUBLICATIONS

International Preliminary Report on Patentability for International Patent Application No. PCT/US2022/022546, mailed Oct. 12, 2023.
(Continued)

*Primary Examiner* — Kristina M Deherrera
*Assistant Examiner* — Gedeon M Kidanu
(74) *Attorney, Agent, or Firm* — Goodwin Procter LLP

(57) ABSTRACT

The exemplary embodiments control solvent pumps so that system flow is constant. One or more controllers may control the flow rate produced by the pumps over time. The one or more controllers control a first pump so that, as the first pump is refilling, a second pump maintains a sufficient flow rate to compensate for the lost flow due to the refilling event. In some exemplary embodiments, the one or more controllers control the timing of the refilling event for the first event such that the refilling event overlaps with the equilibrating of the chromatography column with solvent(s) from the second pump. Similarly, the one or more controllers control the timing of the refilling event for the second pump such that the refilling event overlaps with the equilibrating of the chromatography column.

15 Claims, 11 Drawing Sheets

(58) Field of Classification Search
CPC ............ F04B 49/065; G01N 2030/326; G01N 30/32; G01N 30/34
See application file for complete search history.

(56) References Cited

U.S. PATENT DOCUMENTS

| | | | | |
|---|---|---|---|---|
| 6,228,153 B1* | 5/2001 | Saitoh | .................... | G01N 30/28 |
| | | | | 417/313 |
| 2006/0000759 A1 | 1/2006 | Takao et al. | | |
| 2007/0000312 A1* | 1/2007 | Weissgerber | ........ | G05D 11/132 |
| | | | | 700/282 |
| 2011/0132463 A1* | 6/2011 | Witt | .................... | F04B 11/0058 |
| | | | | 137/565.29 |
| 2015/0219603 A1* | 8/2015 | Jackson | ................ | F04B 49/065 |
| | | | | 700/282 |

OTHER PUBLICATIONS

International Search Report and Written Opinion for International Patent Application No. PCT/US2022/022546, mailed Jun. 10, 2022.

\* cited by examiner

SOLVENT DELIVERY WITH A REDUCED VOLUME SINGLE STROKE PUMPING ARRANGEMENT PROVIDING CONTINUOUS SOLVENT FLOW

CROSS-REFERENCE TO RELATED APPLICATIONS

This application claims the benefit of and priority to U.S. Provisional Patent Application No. 63/168,612, filed on Mar. 31, 2021, the entire contents of which are incorporated by reference.

BACKGROUND

In chromatography systems, solvent delivery systems deliver solvents to a chromatography column, such as a liquid chromatography column, supercritical fluid chromatography column or another form of chromatography column. Typically, pumps drive solvents to the chromatography column. A variety of different pumps may be used in such conventional solvent delivery system. A mixer may be provided as part of the solvent delivery system to thoroughly mix the solvents delivered via the pumps.

FIG. 1 depicts a conventional pump arrangement for delivering solvent to a chromatography column. The conventional pump arrangement of FIG. 1 includes a single stroke pump 100 that includes a plunger 104 within a pump head 102. Mobile phase (i.e., solvent) enters the single stroke pump 100 via an inlet 106. An inlet check valve 108 is provided at the inlet 106 to prevent flow of the mobile phase back out the inlet 106. The mobile phase enters the single stroke pump 100 and is displaced by the plunger 104 out the outlet 110. The plunger 104 may be actuated, for example, by a linear actuator that includes a motor and a ball screw. An outlet check valve 112 prevents flow of the mobile phase back into the single stroke pump 100 via the outlet 110. The pump 100 pumps the mobile phase from a low-pressure solvent reservoir to a high-pressure environment.

One drawback of the approach of the conventional single stroke pump arrangement of FIG. 1 is that a chromatographic run must stop once the plunger 104 reaches the end of its travel. This single stroke pump arrangement requires that the single stroke pump 100 stop to refill. To provide continuous flow, a conventional arrangement like the pump 200 of FIG. 2 may be used. In this arrangement, there are two individual pump heads 202 and 204 that work together to provide continuous flow. As shown, mobile phase from a low-pressure reservoir enters inlet 206 of pump head 202. Plunger 208 displaces the mobile phase out of pump head 202 via outlet 210 on to inlet 212 of pump head 204. Plunger 214 then displaces the mobile phase out of outlet 216 on to the high-pressure system that includes the chromatography column.

The arrangement of FIG. 2 is isocratic in that it only delivers a single solvent. To deliver two solvents, a conventional arrangement 300 shown in FIG. 3 may be used. In this conventional arrangement 300, two pumps 301 and 303 are used to deliver separate solvents (designated as A and B). Each pump 301, 303 has two respective pump heads 302, 304 and 306, 308. Pump 301 receives solvent B from a reservoir via inlet 310. Plunger 311 displaces the solvent B out outlet 312 on to the inlet 314 of pump head 304. Plunger 313 then displaces the solvent B out outlet 316 to a mixing tee 318. The pump head 302 refills with solvent B as the pump head 304 displaces solvent B to the mixing tee. This allows the solvent B to be delivered continuously.

Solvent A from a reservoir enters inlet 320 of pump head 306 and is displaced by plunger 321 to outlet 322 and then on to inlet 324 of pump head 308. The solvent A is displaced by plunger 325 out outlet 326 to the mixing tee 318. Solvents A and B are mixed at mixing tee 318 and pumped to the high-pressure system. Pump head 306 refills with solvent A as pump head 308 displaces solvent B to the mixing tee 318 to provide continuous flow.

Unfortunately, there are several drawbacks to this conventional arrangement of FIG. 3. First, the pumps are large and as such, occupy a large volume of space. Second, the pumps are expensive. Third, flow perturbations and pressure pulses in this arrangement result from the refill events in the pumps 301 and 303. The flow perturbations and pressure pulses may cause pressure and compositional inconsistencies that result in detection noise and band broadening.

FIG. 4 shows two plots 400 and 402 that help to illustrate the noise that may be produced for an illustrative case. Plot 400 shows a chromatogram of milli absorbance units (mAu) versus retention time for a run with two identical mobile phase compositions (5% acetonitrile (ACN) and 95% water with 0.1% trifluoracetic acid (TFA)) with no mixing present in the system. As can be seem from the curve 402, the degree of noise is minimal (0.04 mAu, peak-to-peak, on average) when the mobile phase solvents are pre-mixed prior to pumping and delivered from a single reservoir. In contrast, with plot 404, the curve 406 of the chromatogram has much higher noise (3.0 mAu, peak-to-peak, on average) when the solvents are mixed by the pump. The plot 406 is for a chromatogram where a reservoir holds water with 0.1% TFA and the other reservoir holds ACN with 0.1% TFA run on a system like that of FIG. 3. The magnitude of the noise in plot 400 is due to the pressure perturbation resulting from the pump transfer events, whereas the magnitude of the noise in plot 404 is due to both the pressure perturbation and compositional differences resulting from the pump transfer events.

Dramatic compositional differences caused by the pump transfer events can cause band broadening, which may result in unstable peak retention times in the chromatographic data, thereby adversely affecting the quality of the information obtained from chromatography data. The quality of the information obtained is also diminished by the noise as reflected in a decreased signal to noise ratio. In addition, the band broadening decreases the throughput of the system. The compounded reduction in signal-to-noise ratio increases the limit of detection of the chromatographic system. It is commonplace to include a mixing element to absorb pressure pulses and smooth compositional differences. Mixers contribute to gradient delay volume of a chromatographic system which results in reduction of throughput, a reduction in gradient accuracy which can cause difficulty in method transfer from chromatograph to chromatograph, and to the overall cost of the system.

Pumps are specifically designed to reduce compositional and pressure perturbations during the transfer event. The pumping elements are designed to move very quickly to minimize the amount of time required to transfer and to ensure fast and effective checking of check valves. Fast-moving pumping elements therefore contraindicate the use of gear reduction and require large, high torque motors. Further, since the pumping elements must reverse direction during the transfer event, any gear lash in the linear actuator is undesirable thereby necessitating expensive and accurate actuators, and further precluding gear reduction.

SUMMARY

In accordance with a first inventive aspect, a solvent delivery system for a chromatography system has a chromatography column from which analytes of interest elute. The solvent delivery system includes a first pump with a single plunger for pumping a first component of a solvent system. The first pump has a repeating operational cycle with a delivery phase and a refilling phase. The solvent delivery system also includes a second pump with a single plunger for pumping a second component of the solvent system. The second pump has a repeating operational cycle with a delivery phase and a refilling phase. The solvent delivery system further includes one or more processors configured to control the first pump and the second pump so that as the first pump is in the refilling phase, the second pump is in the delivery phase, and as the second pump is in the refilling phase, the first pump is in the delivery phase. The refilling phases of the first pump and the second pump do not occur during the eluting of the analytes of interest from the chromatography column.

The first component of the solvent system may be a single solvent or may contain multiple solvents. Likewise, the second component of the solvent system may be a single solvent or contain multiple solvents. The one or more processors may be part of a controller for both the first pump and the second pump. The one or more processors may comprise multiple processors, and the multiple processors may include a first processor that is part of a controller of the first pump and a second processor that is part of another controller for the second pump. The first pump and the second pump may be single stroke pumps. The second pump in the delivery phase may maintain a sufficient flow rate to compensate for a loss of flow of the first component of the solvent system due to the refilling phase of the first pump. The first pump in the delivery phase may maintain a sufficient flow rate to compensate for a loss of flow of the second component of the system due to the refilling phase of the second pump. The solvent delivery system may also include reservoirs for storing the first component and the second component.

In accordance with another inventive aspect, a solvent delivery system for a chromatography system has a chromatography column from which analytes of interest elute. The solvent delivery system includes a first pump with a single plunger for pumping a first component of a solvent gradient over a first fluid path to the mixing tee. The first pump has a repeating operational cycle with a delivery phase and a refilling phase. The solvent delivery system also includes a second pump with a single plunger for pumping a second component of the solvent gradient over a second fluid path to the mixing tee. The second pump has a repeating operational cycle with a delivery phase and a refilling phase. The solvent delivery system includes a first proportioning valve connected to an input of the first pump for providing proportions of multiple solvents for the first component of the solvent gradient to the first pump and a second proportioning valve connected to an input of the second pump for providing proportions of multiple solvents for the second component of the solvent gradient to the second pump. The solvent delivery system additionally includes one or more processors configured to control the first pump and the second pump so that as the first pump is in the refilling phase, the second pump is in the delivery phase, and as the second pump is in the refilling phase, the first pump is in the delivery phase. The refilling phases of the first pump and the second pump do not occur during the eluting of the analytes of interest from the chromatography column.

The solvent delivery system may include multiple solvent reservoirs connected to the first proportioning valve or the second proportioning valve. The first pump and the second pump may be single stroke pumps. The one or more processors may be part of a controller for both the first pump and the second pump. The one or more processors may include multiple processors, and the multiple processors may include a first processor that is part of a controller of the first pump and a second processor that is part of another controller for the second pump.

In accordance with another inventive aspect, a method includes configuring one or more processors of a controller to control a first pump with a single plunger and a second pump with a single plunger in a solvent delivery system for a chromatography system so that when the first pump is in a refilling phase for refilling the first pump with a first component of a solvent, the second pump is in a delivery phase for equilibrating a chromatography column from which analytes of interest elute with a second component of a solvent system. Per the method, the one or more processors of the controller are configured to control the first pump and the second pump so that when the second pump is in a refilling phase for refilling the second pump with a second component of a solvent gradient, the first pump is in a delivery phase for equilibrating the chromatography column with a first component of a solvent system. The refilling phases of the first pump and the second pump do not occur during the eluting of the analytes of interest from the chromatography column.

The method may include configuring the one or more processors of the controller to set a flow rate of the delivering phase for the second pump to compensate for a loss of flow during the refilling phase of the first pump. The method may entail configuring the one or more processors of the controller to set a flow rate of the delivery phase for the first pump to compensate for a loss of flow during the refilling phase of the first pump. The refilling phase of the first pump and the refilling phase of the second pump may be temporally offset. The method may also include controlling the first pump and the second pump with the controller.

DETAILED DESCRIPTION

Figure 3:
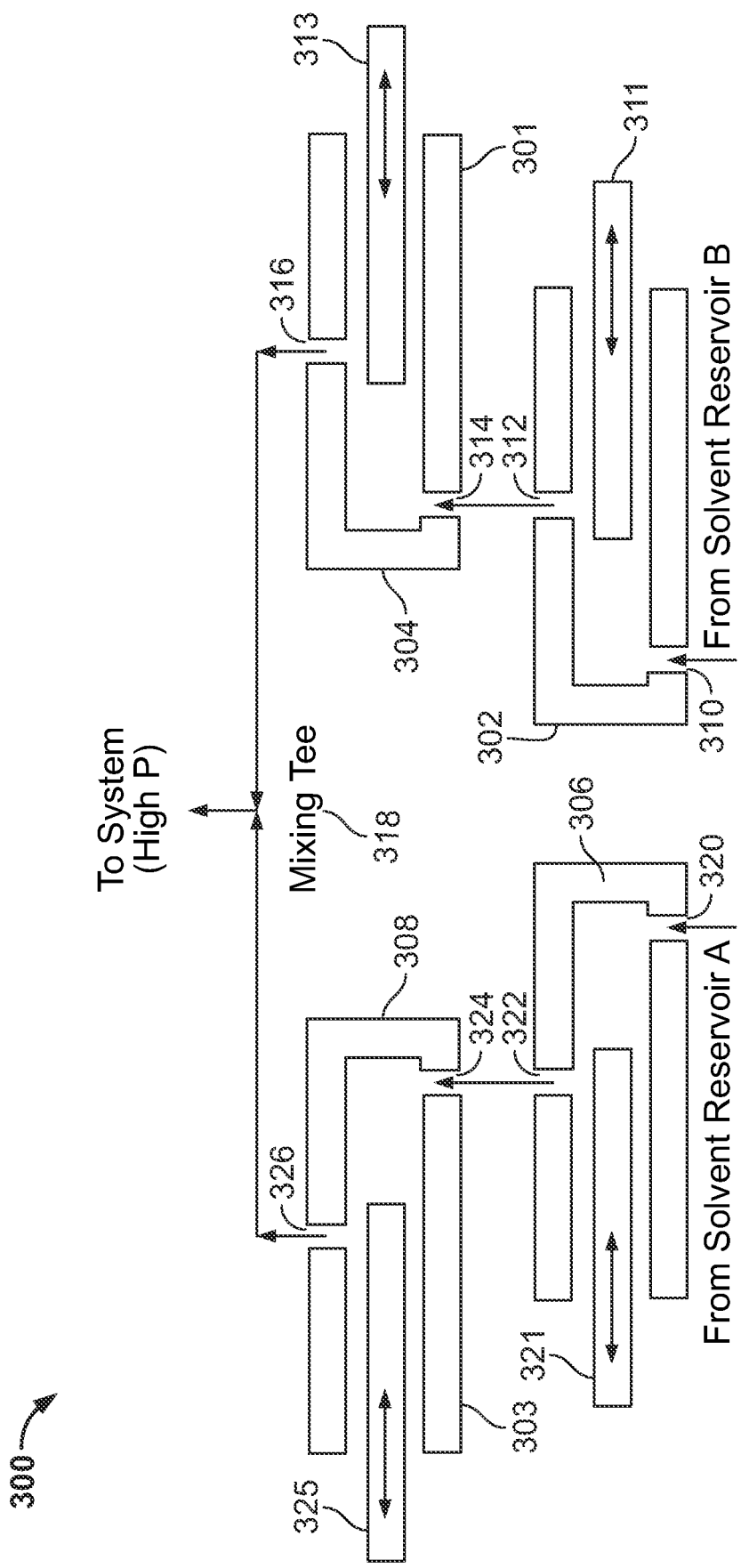
FIG. 3 depicts a conventional two pump arrangement where each pump includes two plungers to provide continuous flow in a solvent delivery system.
Figure 4:
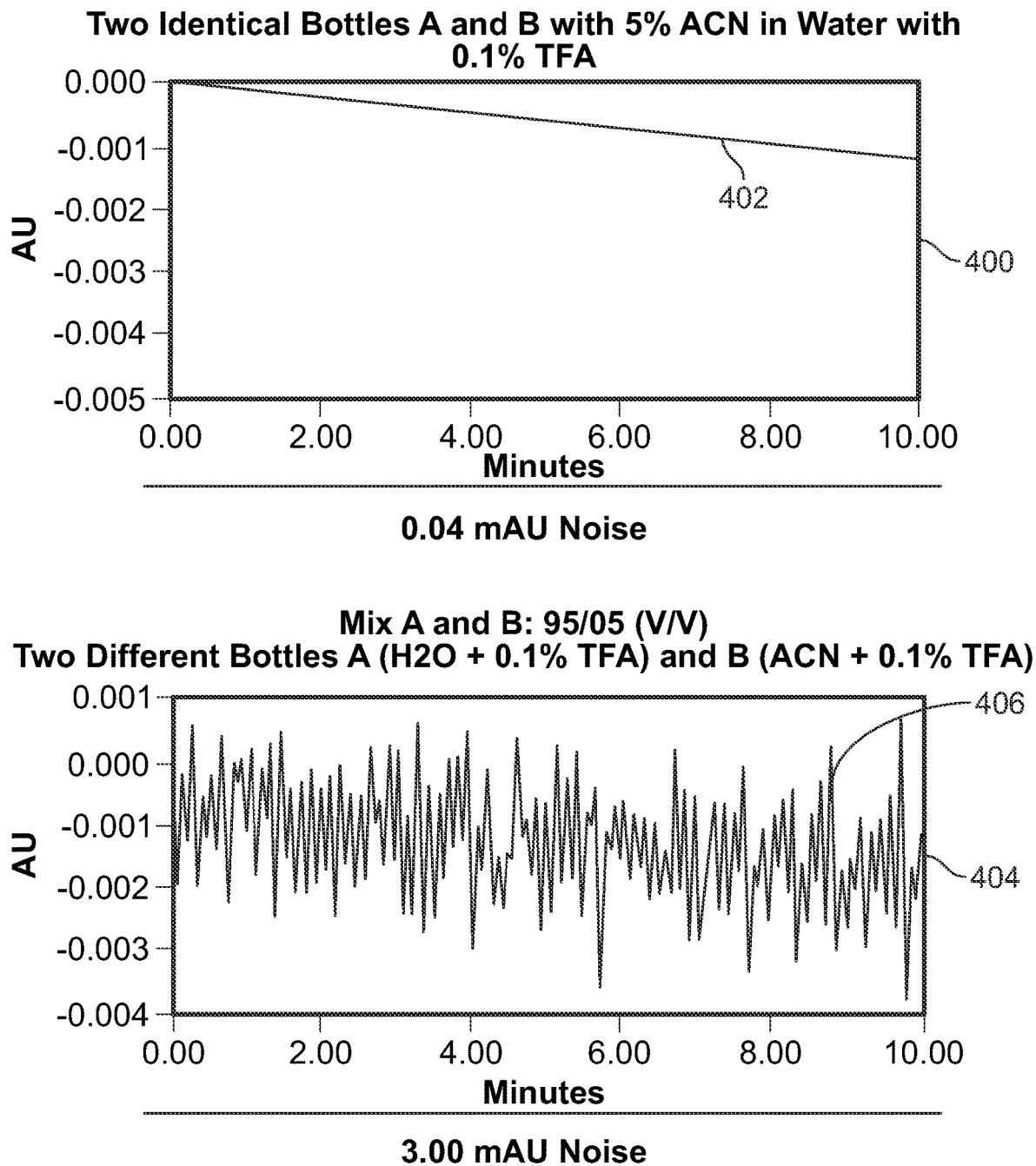
FIG. 4 depicts an example of the noise in a chromatogram resulting from an arrangement like FIG. 3 due to refilling events.

The exemplary embodiments may provide a solvent delivery system that avoids the pitfalls discussed above of flow perturbations and pressure pulses that may produce noise and band broadening with conventional solvent delivery systems. In addition, the exemplary embodiments may only need a single plunger per solvent. Thus, for a system delivering two solvents, only two pumps with single plungers are needed. The exemplary embodiments may use single stroke pumps with a single plunger. These pumps are less expensive than the conventional arrangement of FIG. 3. Moreover, these pumps may be smaller than the conventional arrangement of FIG. 3.

The exemplary embodiments control pumps so that system flow is without interruptions. This eliminates the refilling events that cause flow perturbations and pressure pulses. The pumps of the exemplary embodiments may be controlled by one or more controllers. The one or more controllers control the flow rate produced by the pumps over time. As will be explained in more detail below, the one or more controllers control a first pump so that as the first pump is refilling, a second pump maintains a sufficient flow rate to compensate for the lost flow rate due to the refilling event.

The exemplary embodiments may use the pumps to deliver a solvent system. The solvent system is a combination of solvents, modifiers, and additives comprising the mobile phase. Isocratic solvent systems are comprised of one or more components which stay constant in relative proportion while the analytes of interest are eluted from the column. The composition may be altered after the analytes of interest elute to wash the column. If a wash step is performed, an equilibration period must be performed before the next injection to ensure consistent retention times.

The exemplary embodiments may provide a composition-programmed gradient elution solvent system. Such a solvent system includes more than one component and the relative proportion of the components is altered while the analytes of interest are being eluted from the chromatographic column. Most commonly, the composition of the mobile phase is altered from a 'weak solvent' (i.e. a condition which promotes retention of the analyte) to a 'strong solvent' (a condition which promotes elution of the analyte). Often, a wash step is performed with strong solvent. An equilibration step at initial composition is required prior to the next injection to promote consistent analyte retention times.

Each (gradient) chromatographic experiment is comprised of an inject stage, (occasionally an isocratic hold), a gradient stage, a wash stage and an equilibration stage. The gradient stage is when the two delivery rates by respective pumps change over time. The gradient stage changes the composition from predominately weak to predominately strong in composition. The gradient stage is often where data is recorded and is therefore the most important portion for maintaining low noise. The wash stage is when strong solvent (i.e. high organic in reversed-phase LC) flows through the chromatography column. The equilibration stage is when weak solvent (aqueous in RPLC) flows through the chromatography column.

We will generally speak of only two phases for each pump: a delivery phase when the pump is delivering solvent and a refilling phase when the pump is being refilled with a solvent or component of a solvent system.

In some exemplary embodiments, the one or more controllers control the timing of the refilling event for the first event such that the refilling event overlaps with the equilibrating of the chromatography column with solvent(s) from the second pump (i.e., part of the delivery phase for the second pump). Similarly, the one or more controllers control the timing of the refilling event for the second pump such that the refilling event overlaps with the equilibrating of the chromatography column with solvent(s) from the first pump (i.e., part of the delivery phase of the first pump). The approach enables the flow of solvents to be continuous through the cycles of the pumps and causes the flow anomalies to be outside of the gradient elution portion of an experiment. Since no transfer events are required during the gradient elution portion of the experiment, no pressure perturbations and compositional differences are incurred and the needs for mixing are dramatically reduced or eliminated. The reduction of mixing requirements results in reduced gradient delay volume, more accurate gradient shape, and reduced overall cost of the system. In the exemplary embodiment, the mixing element is a simple tee.

Figure 5:
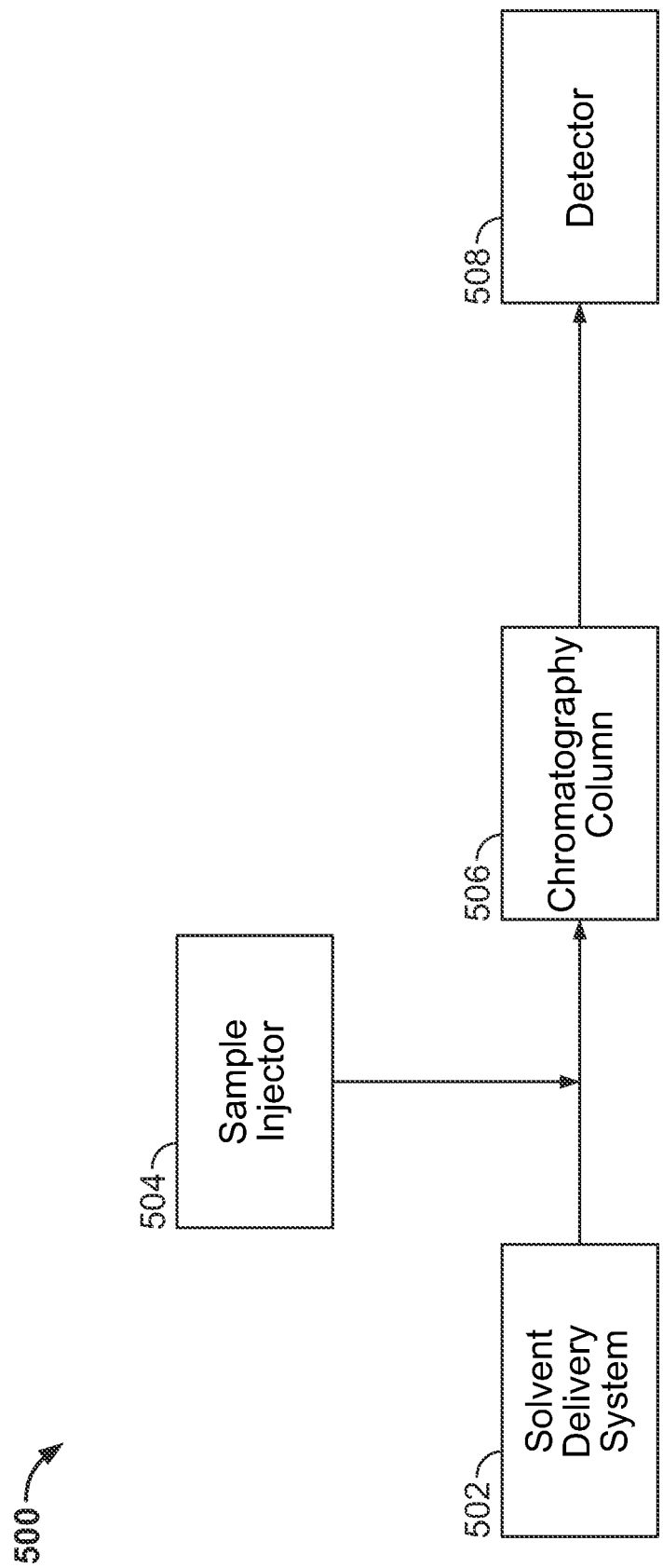
FIG. 5 depicts an illustrative chromatography system for exemplary embodiments.

FIG. 5 depicts a block diagram of a chromatography system 500 suitable for exemplary embodiments. The chromatography system 500 includes a solvent delivery system 502 for delivering solvents to a chromatography column 506. The chromatography column 506 may be, for example, a liquid chromatography column, a supercritical fluid chromatography column or other type of chromatography column. A sample injector 504 may inject a sample solution into the flow of mobile phase (e.g., solvents) output by the solvent delivery system 502. The sample solution includes an analyte sample in solution. The mobile phase with the sample solution enters the chromatography column 506. The sample elutes from the chromatography column 506 and is detected by a detector 508.

Figure 6:
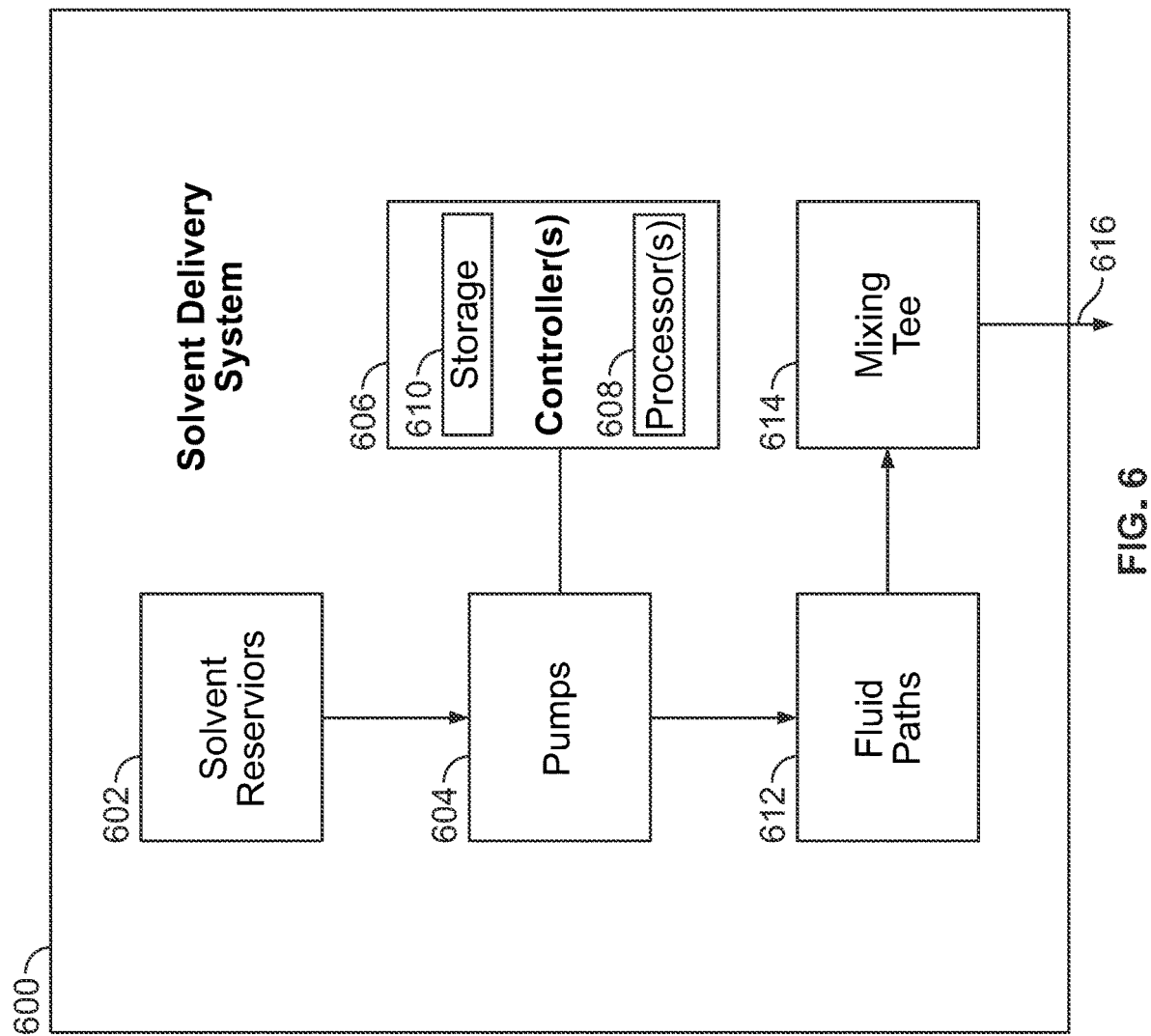
FIG. 6 depicts illustrative components of a solvent delivery system for exemplary embodiments.

FIG. 6 depicts a more detailed depiction of components of the solvent delivery system. The solvent delivery system 600 may include solvent reservoirs 602 for holding solvents that may be delivered by the solvent delivery system 600. The solvents in the solvent reservoirs 602 may be pumped out of the reservoirs by pumps 604. In the exemplary embodiments, these pumps 604 may include multiple single stroke pumps arranged as will be discussed below. The pumps 604 may be controlled by controller(s) 606. The controller(s) 606 may be for example, a single controller for all of the pumps 604 or a separate controller for each pump, where the controllers coordinate activity of the respective pumps. The controller(s) 606 may include processor(s) 608 for executing computer programming instructions. Each processor may be a Central Processing Unit (CPU), a Graphics Processing Unit (GPU), a Field Programmable Gate Array (FPGA), an Application Specific Integrated Circuit (ASIC) or a special purpose microcontroller. Each processor of the processor(s) 608 may include one or more cores.

Figure 7:
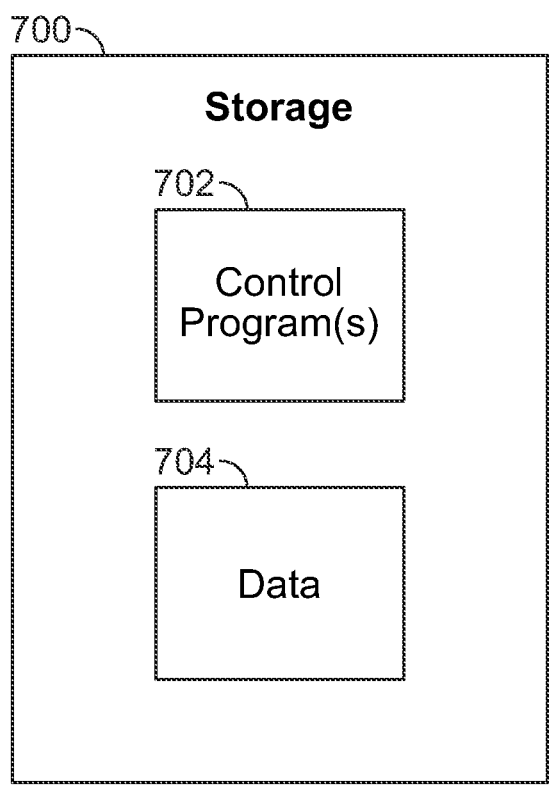
FIG. 7 depicts a storage suitable for controller(s) of pump in exemplary embodiments.

The controller(s) 606 may include a storage 610. The storage 610 may include memory and/or storage components, such as Random Access Memory (RAM) components, Read Only Memory (ROM) components (including EPROM and EEPROM components), flash memory components, optical disk components, magnetic disk components, solid state memory components, removable memory media and/or other types of non-transitory computer-readable storage media. The storage 610 may hold data, files and/or programs. In some exemplary embodiments, as shown in FIG. 7, the storage 700 stores control program(s) 702 and Data 704. The control program(s) 702 include computer programming instructions that may be executed by the processor(s) 608 to control the pumps 604. It should be appreciated that the computer programming instructions for controlling the pumps 604 need not be a control program(s) 702 per se but rather may be realized in a module, an applet, a library, a method, a subroutine, a procedure, a function, an object or other form.

As shown in FIG. 6, the mobile phase is output by the pumps along fluid paths 612 created by fluid conduits, such as tubing and the like, to a mixing tee 614. The mixing tee 614 is a conjunction where the solvents from the respective pumps 604 mix. The resulting mobile phase is output 616 from the mixing tee into a fluidic path leading the chromatography column, such as shown in FIG. 5.

Figure 1:
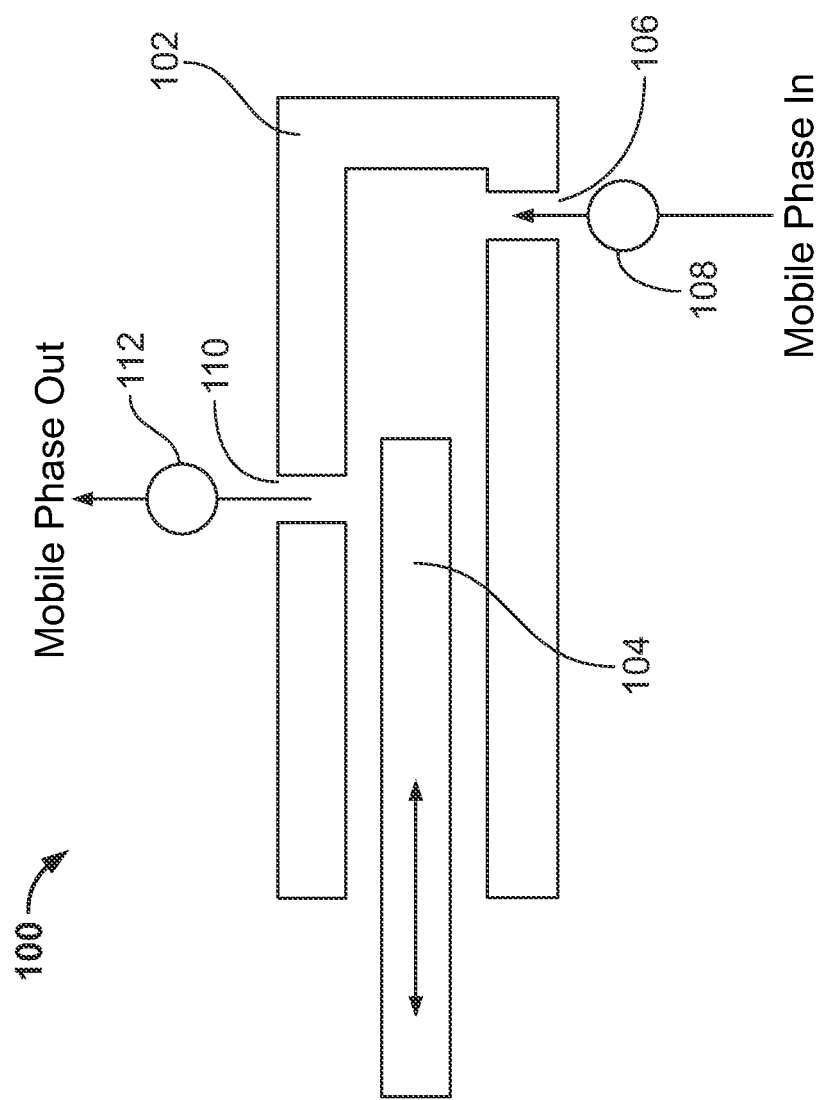
FIG. 1 depicts a conventional single stroke valve for a solvent delivery system of a chromatography system.
Figure 2:
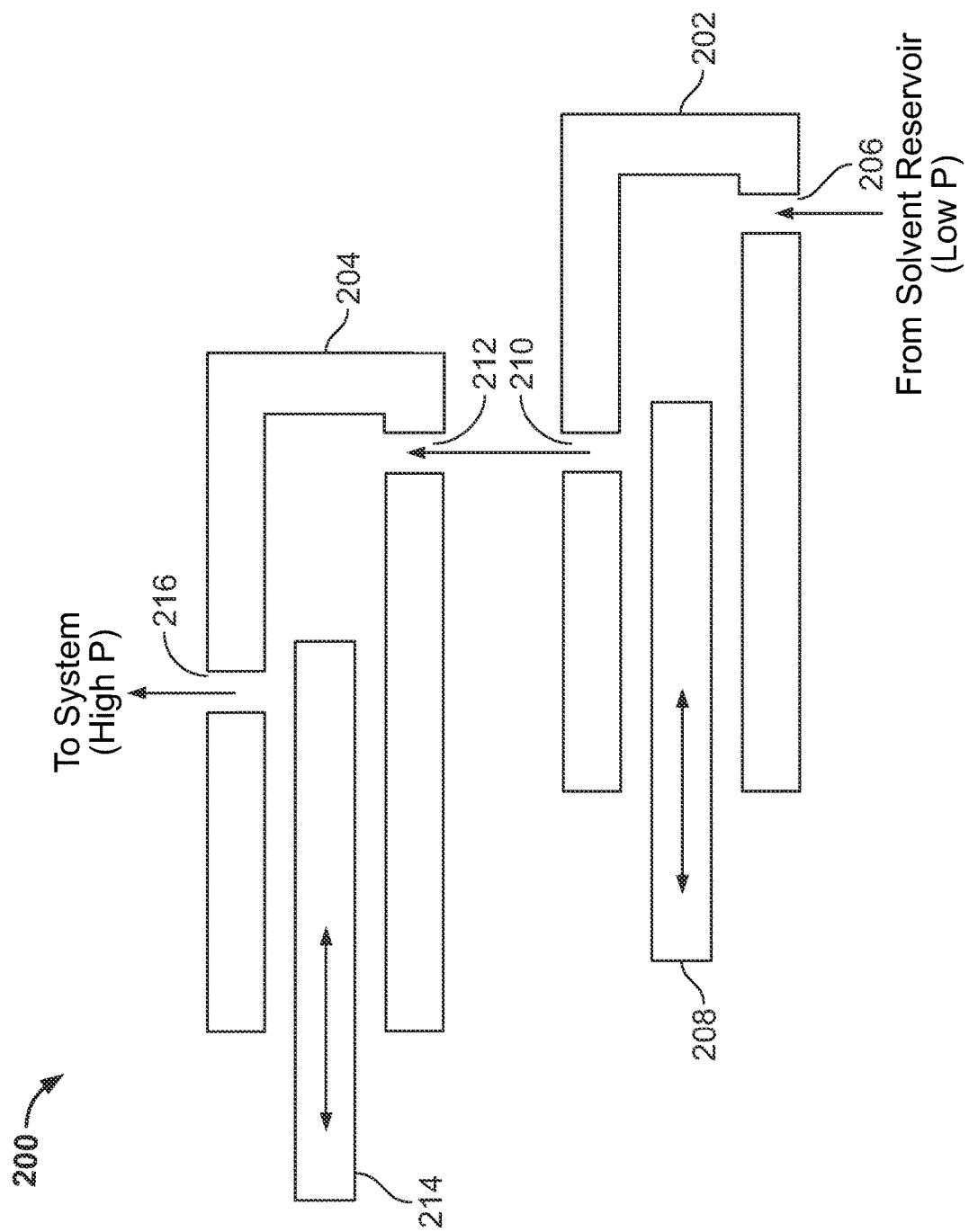
FIG. 2 depicts a conventional pump arrangement using two plungers to provide continuous flow in a solvent delivery system.
Figure 8:
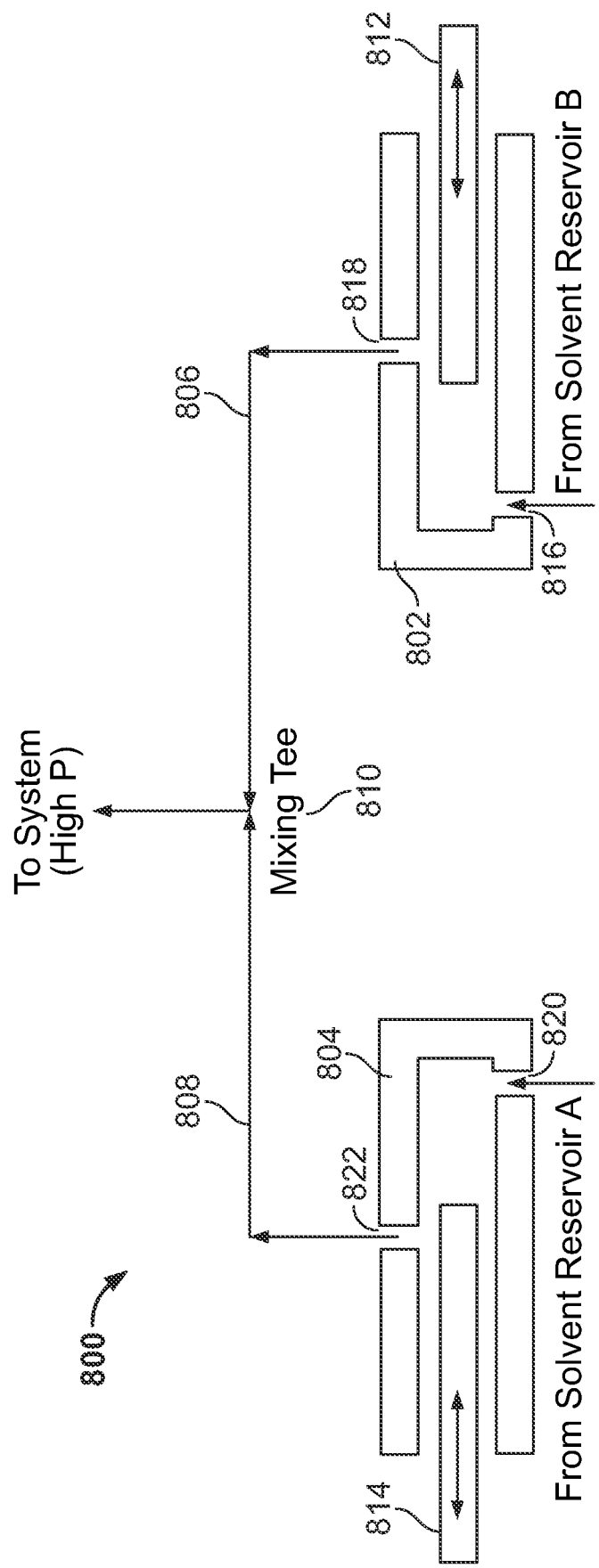
FIG. 8 depicts an illustrative arrangement for two single stroke pumps for an exemplary embodiment.

FIG. 8 shows an example of an arrangement for a solvent delivery system 800 for an exemplary embodiment. The solvent delivery system 800 includes a single stroke pump 802 and a single stroke pump 804. Single stroke pump 802 receives solvent B from a reservoir via an inlet 816. The solvent B is displaced by plunger 812 to outlet 818 on to a fluidic path 806 that leads to mixing tee 810. Single stroke pump 804 receives solvent A from a reservoir at inlet 820. Plunger 814 displaces solvent A through outlet 822 to fluidic path 808 that leads to the mixing tee. Solvent A and solvent B mix at the mixing tee and flow to the high-pressure system as described above. Not shown are inlet and outlet check valves to prevent backflow during delivery and refilling phases (like those depicted in FIG. 1).

The arrangement of FIG. 8 provides continuous flow by controlling the timing of the cycles of the pumps 802 and 804 to prevent interruption of system flow. The controller(s) 606 control the pumps 802 and 804 to realize such continuous flow.

Figure 9:
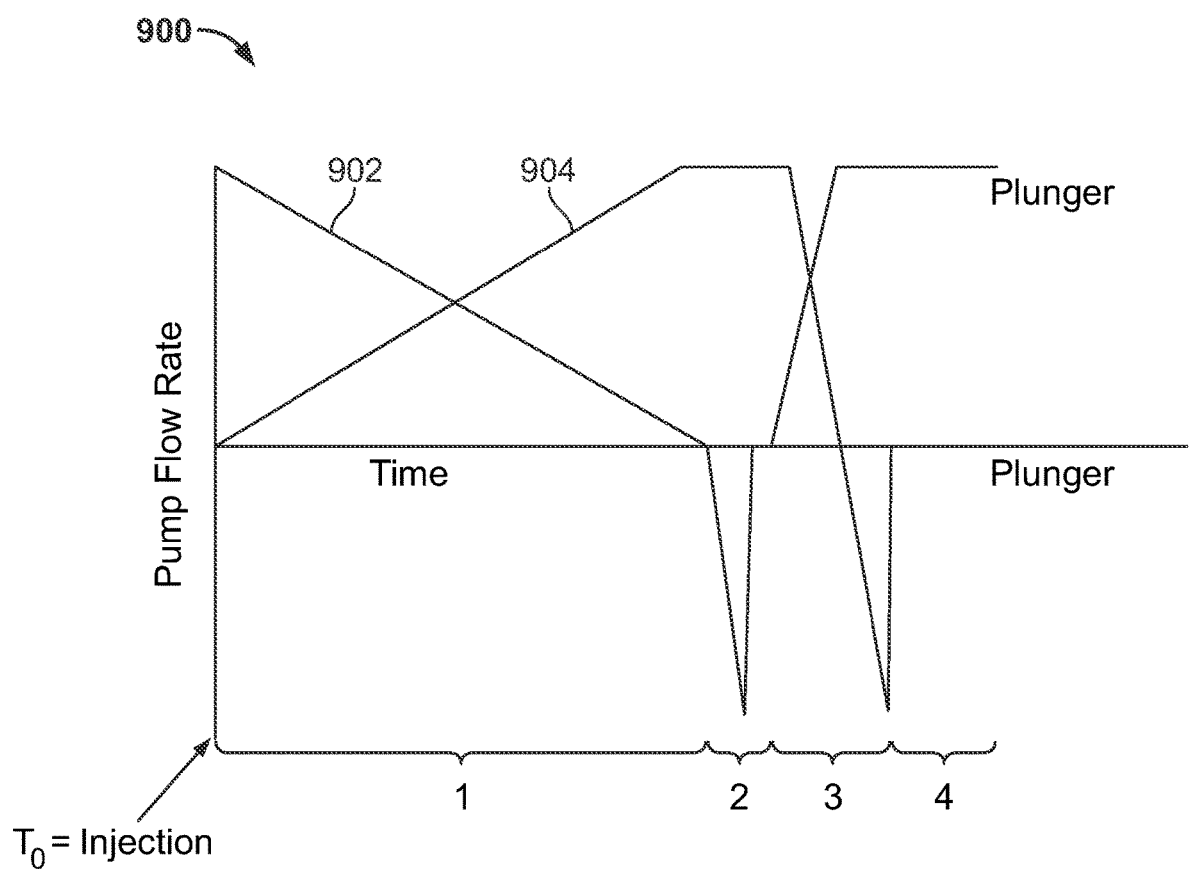
FIG. 9 depicts a diagram of varying flow rates of pumps in an exemplary embodiment.

FIG. 9 depicts a plot of the pump flow rates for two pumps, such as pump 802 and pump 804. Curve 902 represents the flow rate of pump 804 and curve 902 represents the flow rate of pump 802. Each of the pumps 802 and 804 has an operational cycle as described above that includes a delivery phase and a refilling phase. The operational cycle in repeatable during operation of the pumps 802 and 804. A time 0, the sample is introduced into the system and the gradient starts. The pumps start following a programmed gradient profile. As can be seen in the example diagram of FIG. 9, initially the pumps 802 and 804 are in the delivery phase (see 1 in FIG. 9). As can be seen, pump 804 is at a high flow rate and ramps down as indicated by the downward slope of curve 902. At the same time, pump 802 is a low rate and ramps up to a high flow rate as indicted by the upward slope of curve 904. The combined flow rate of the pumps is kept constant throughout the experiment. As this transition occurs, the percentage of Solvent A in the gradient decreases, and the percentage of solvent B in the gradient increases. Once delivery of the gradient is complete, pump 804 enters the refilling phase, and while pump 802 enters the delivery phase (see 2 in FIG. 9). In the refilling phase, solvent A refills pump 804. The flow rate of the pump 802 is high (see 904) and compensates for the absence of flow from pump 804 (see 902). The negative flow shown in FIG. 9 during the refilling phase indicates that solvent is being added to refill the pump chamber.

Next, it is time to equilibrate the chromatography column 506 with solvent A. Pump 802 enters the refilling phase (see the drop in curve 904), and at the same time pump 804 enters the delivery phase at a high flow rate (see curve 902 and see 3). The high flow rate of pump 802 compensates for the loss of flow from the pump 804 during the refilling phase and provides continuous flow. This approach substantially eliminates the flow perturbations and pressure waves experienced with refilling events in conventional systems during the important gradient region of the experiment when analytes of interest are eluting from the chromatography column for detection. Lastly, as a final part of the delivery phase cycles of pumps 802 and 804 they provide equilibration (see 4 in FIG. 9) to prepare for the next operational cycle instances.

Since no transfer events are required to maintain continuous flow and the individual pumping elements are refilling during wash and equilibration phases, there is no longer need for extremely fast pump movements. The exemplary embodiments therefore allow for gear reduction and enable smaller, lower torque motors. Further, since to transfer event is required, the pumping elements are not reversing direction during the gradient delivery portion of the experiment, but they are reversing during wash and equilibration steps. During the wash and equilibration stages, some pressure ripple is acceptable since it does not reduce the signal to noise ratio while analytes of interest are detected. Accordingly, there is increased tolerance for gear lash enabling less precise linear actuators and gear assemblies.

Figure 10:
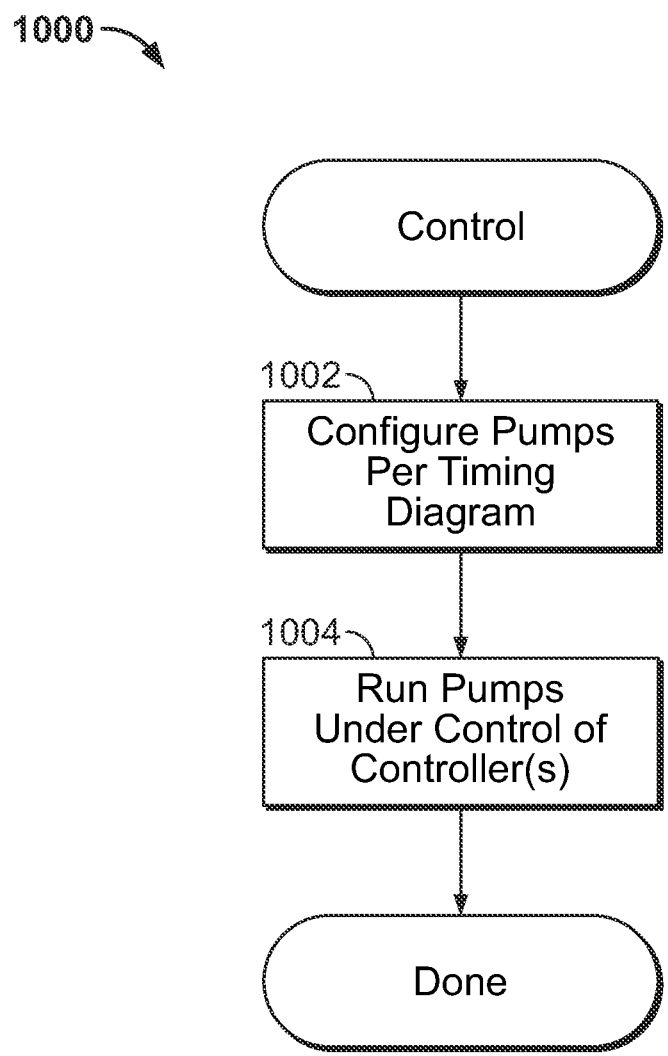
FIG. 10 depicts a flow chart of steps that may be performed to control the pumps with the controller(s) in exemplary embodiments.

As was mentioned above, the controller(s) 606 control the flow rates to realize the timing synchronization of the pump that is illustrated in FIG. 9. FIG. 10 shows a flowchart 100 of illustrative steps that may be performed to realize this control. Initially, the controller(s) 606 are configured to regulate the flow rates in a manner consistent with a timing as defined in a chart like FIG. 9 or some other timing arrangement (1002). This may entail programming or configuring a single controller or multiple controllers, depending on whether one controller or multiple controllers are used. The pumps are the run under the control of the configured or programmed controller(s) 1004.

Figure 11:
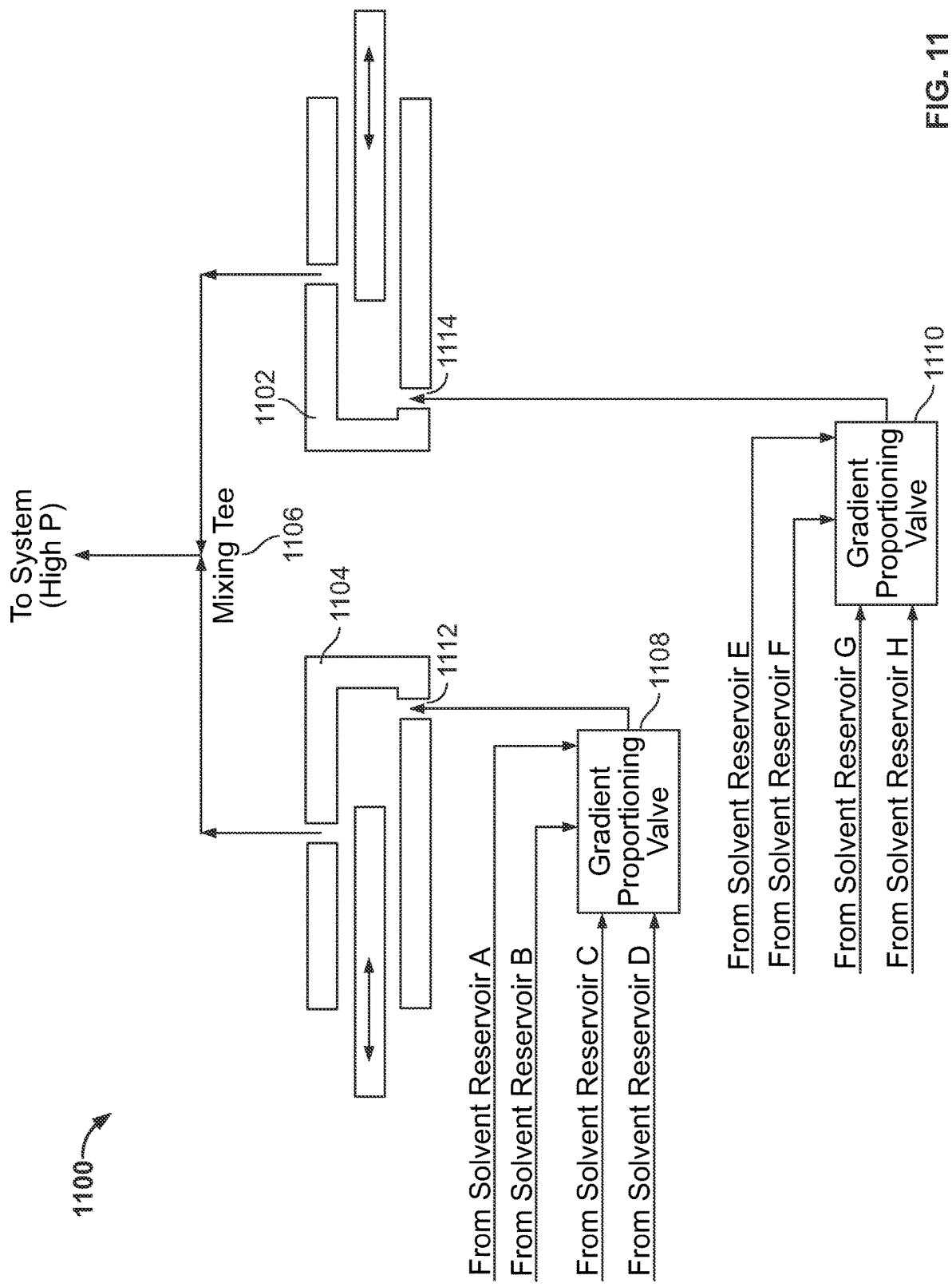
FIG. 11 depicts an alternative arrangement of pumps where gradient proportioning valves are used.

The arrangement of the solvent delivery system depicted in FIG. 8 has each pump 802 and 804 pumping a single solvent. In an alternative exemplary embodiment as depicted in FIG. 11, each pump 1102 and 1104 pumps multiple solvents as a component of the delivered solvent gradient that is output by mixing tee 1106. A gradient proportioning valve 1110 is provided to provide the first component of the solvent gradient to the inlet 1114 of pump 1102. The gradient proportioning valve 1100 is connected to reservoirs for solvents E, F, G and H and may create the first component from these solvents in varying proportions. The first component may include any combination of the solvents E, F, G and H ranging from a single solvent to all of the solvents. A gradient proportioning valve 1108 also is connected to solvent reservoirs for solvents A, B, C and D and may provide combinations of these solvents in varying proportions to the inlet 1112 of pump 1104 as the second component of the solvent gradient. The arrangement 1100 otherwise is configured and operates like the arrangement 800 of FIG. 8.

It should be appreciated that in some alternative embodiments, a gradient proportioning valve provides the input to only a single one of the pumps.

While the present invention has been described with reference to exemplary embodiments, various changes in form and detail may be made without departing from the intended scope as defined in the appended claims.

The invention claimed is:

1. A solvent delivery system for a chromatography system having a chromatography column from which analytes of interest elute, comprising:
   a first pump with a single plunger that pumps a first component of a solvent system, the first pump having a repeating operational cycle with a delivery phase and a refilling phase;

a second pump with a single plunger that pumps a second component of the solvent system, the second pump having a repeating operational cycle with a delivery phase and a refilling phase; and one or more processors configured to control the first pump and the second pump so that:
- as the first pump is in the refilling phase, the second pump is in the delivery phase, and
- as the second pump is in the refilling phase, the first pump is in the delivery phase;, and
- the refilling phases of the first pump and the second pump do not occur during the eluting of the analytes of interest from the chromatography column.

2. The solvent delivery system of claim 1, wherein the first component of the solvent system is a single solvent.

3. The solvent delivery system of claim 2, wherein the second component of the solvent system is a single solvent.

4. The solvent delivery system of claim 1, wherein the first component of the solvent system contains multiple solvents.

5. The solvent delivery system of claim 1, wherein the one or more processors are part of a controller for both the first pump and the second pump.

6. The solvent delivery system of claim 1, wherein the one or more processors comprise multiple processors and wherein the multiple processors include a first processor that is part of a controller of the first pump and a second processor that is part of another controller for the second pump.

7. The solvent delivery system of claim 1, wherein the first pump and the second pump are single stroke pumps.

8. The solvent delivery system of claim 1, wherein the second pump in the delivery phase maintains a sufficient flow rate to compensate for a loss of flow of the first component of the solvent system due to the refilling phase of the first pump.

9. The solvent delivery system of claim 1, wherein the first pump in the delivery phase maintains a sufficient flow rate to compensate for a loss of flow of the second component of the solvent system due to the refilling phase of the second pump.

10. The solvent delivery system of claim 1, further comprising reservoirs for storing the first component and the second component.

11. A method, comprising:
- configuring one or more processors of a controller to control a first pump with a single plunger and a second pump with a single plunger in a solvent delivery system for a chromatography system so that when the first pump is in a refilling phase for refilling the first pump with a first component of a solvent, the second pump is in a delivery phase for equilibrating a chromatography column from which analytes of interest elute with a second component of a solvent system;
- configuring the one or more processors of the controller to control the first pump and the second pump so that when the second pump is in a refilling phase for refilling the second pump with a second component of a solvent gradient, the first pump is in a delivery phase for equilibrating the chromatography column with a first component of a solvent system; and
- wherein the refilling phases of the first pump and the second pump do not occur during the eluting of the analytes of interest from the chromatography column.

12. The method of claim 11, further comprising configuring the one or more processors of the controller to set a flow rate of the delivery phase for the second pump to compensate for a loss of flow during the refilling phase of the first pump.

13. The method of claim 11, further comprising configuring the one or more processors of the controller to set a flow rate of a washing phase for the first pump to compensate for loss of flow during the refilling phase of the first pump.

14. The method of claim 11, wherein the configuring steps are performed by one or more processors for controlling the first pump and the second pump.

15. The method of claim 14, wherein the one or more processors comprise a processor for controlling the first pump and a processor for controlling the second pump.

* * * * *